United States Patent [19]
Yamaura

[11] Patent Number: 5,598,907
[45] Date of Patent: Feb. 4, 1997

[54] APPARATUS AND METHOD FOR DIAGNOSING FAULTS IN A HYDRAULIC TYPE LOCK-UP CLUTCH

[75] Inventor: Kenichi Yamaura, Atsugi, Japan

[73] Assignee: Unisia Jecs Corporation, Atsugi, Japan

[21] Appl. No.: 365,147

[22] Filed: Dec. 28, 1994

[30] Foreign Application Priority Data

Dec. 28, 1993 [JP] Japan ................................. 5-336017

[51] Int. Cl.⁶ .................................................. F16D 25/08
[52] U.S. Cl. ........................ 192/3.29; 192/3.3; 192/85 R
[58] Field of Search ................... 192/3.29, 3.3, 192/3.33, 85 R

[56] References Cited

U.S. PATENT DOCUMENTS

| | | | |
|---|---|---|---|
| 4,051,932 | 10/1977 | Arai et al. | 192/3.3 |
| 4,290,325 | 9/1981 | Nishimura | 192/3.29 X |
| 4,655,330 | 4/1987 | Nishikawa et al. | 192/3.3 |
| 4,660,690 | 4/1987 | Nishikawa et al. | 192/3.31 |
| 4,768,632 | 9/1988 | Moan | 192/3.29 X |
| 4,768,635 | 9/1988 | Sukurai et al. | 192/3.29 X |
| 4,795,015 | 1/1989 | Hibino et al. | 192/3.29 X |
| 4,819,777 | 4/1989 | Yasue et al. | 192/3.29 X |
| 4,947,734 | 8/1990 | Fujita et al. | 192/3.3 X |

FOREIGN PATENT DOCUMENTS

| | | | |
|---|---|---|---|
| 59-17061 | 1/1984 | Japan | 192/3.29 |
| 2-195071 | 8/1990 | Japan | 192/3.29 |
| 2-261965 | 10/1990 | Japan | 192/3.29 |

Primary Examiner—Andrea L. Pitts
Attorney, Agent, or Firm—Foley & Lardner

[57] ABSTRACT

The oil amount of operating oil flowing in a relief path to an oil pan from a solenoid valve for switching between engagement/disengagement of a hydraulic type lock-up clutch provided in a torque converter is detected. A solenoid valve fault is judged when in spite of control of the solenoid valve to relieve the operating oil, the relief oil amount is smaller than an estimated value.

10 Claims, 4 Drawing Sheets

APPARATUS AND METHOD FOR DIAGNOSING FAULTS IN A HYDRAULIC TYPE LOCK-UP CLUTCH

FIELD OF THE INVENTION

The present invention relates to an apparatus and method for diagnosing faults in a hydraulic type lock-up clutch of a torque converter provided in a vehicle automatic transmission.

DESCRIPTION OF THE RELATED ART

In general with electronically controlled automatic transmissions wherein a transmission is connected to an internal combustion engine by way of a torque converter, under predetermined conditions, the output shaft of the engine and the input shaft of the automatic transmission are connected directly by the mechanical engagement of a hydraulic type lock-up clutch and not through the torque converter. As a result slip between the engine and the transmission (difference in rotational speed) becomes zero, so that the engine output is effectively transferred to the transmission, thereby improving fuel consumption and exhaust composition.

However, if a fault occurs in the solenoid valve which controls the hydraulic pressure supplied from the hydraulic unit to the lock-up clutch so that the lock-up clutch cannot be engaged in spite of operating under the predetermined conditions for engagement of the lock-up clutch, then a slip (rotational speed difference) occurs between the engine and the transmission. As a result the engine output cannot be effectively transferred to the transmission, calling for more output than necessary, and thus causing a deterioration in fuel consumption and exhaust composition.

Alternatively, if the lock-up clutch remains engaged even when not operating under the predetermined conditions for engagement of the lock-up clutch, then various types of problems arise such as an increase in speed change shock, engine stall, and difficulty in starting, causing a considerable loss in vehicle drivability.

Consequently, in the event of a fault in the solenoid valve which constitutes a hydraulic control device for engagement and disengagement of the lock-up clutch, then it is necessary to quickly bring this to the driver's attention so as to effect remedial treatment and keep the above undesirable conditions to a minimum.

SUMMARY OF THE INVENTION

The present invention takes into consideration the above situation, with the object of providing a fault diagnosis apparatus and method of simple construction which can diagnose to a high accuracy whether or not the hydraulic control device which engages/disengages the lock-up clutch is operating normally, and thus keep to a minimum the undesirable conditions such as a deterioration in fuel consumption, exhaust composition, and vehicle drivability which accompany a fault in the hydraulic control device.

To achieve the above objects, the apparatus and method according to the present invention for diagnosing a fault in a hydraulic type lock-up clutch provided in a torque converter disposed between an internal combustion engine and a transmission for mechanically connecting an output shaft of the engine to an input shaft of the transmission, involves detecting a control signal which indicates engagement or disengagement of the hydraulic type lock-up clutch, detecting a condition amount in a hydraulic oil line, which changes with oil pressure control in accordance with the control signal, and diagnosing a fault in the hydraulic type lock-up clutch based on a comparison of a condition amount estimated according to the detected control signal, and a detected actual condition amount.

With such a construction, it can be diagnosed whether or not the oil pressure is actually being controlled in accordance with the control signal, by detecting whether or not the condition amount in the hydraulic line has a value which matches the control signal. Consequently it can be reliably diagnosed if a hydraulic control device is actually being operated, and the oil pressure is being controlled in correspondence with this operation.

Here in the case where the hydraulic type lock-up clutch is engaged or disengaged by switching between an oil pressure supply condition and relief condition by means of a solenoid valve, then the condition amount in a hydraulic relief path may be detected.

With such a construction, it can be judged from the condition amount in the relief path whether or not the oil pressure is being relieved via the relief path, and if the result of this judgement is compared with the result of a judgement of whether or not the control signal at that time is one indicating relief, then fault diagnosis can be easily carried out.

In the case where the condition amount is detected in the relief path, then the oil amount can be detected as the condition amount.

With such a construction, if the oil pressure is relieved in correspondence with the control signal, then oil flows in the relief path, and fault diagnosis can be carried out based on whether or not the oil amount has a value which matches that for the relief condition.

Moreover, in the case where the condition amount in the relief path is detected, then the temperature may be detected as the condition amount.

With such a construction, it can be judged if relief is actually occurring, based in the expected temperature change on the relief path for when the oil pressure is being or not being relieved.

Furthermore, in the case where the temperature in the relief path is detected, then fault diagnosis may be carried out based on a comparison of a temperature difference between the oil temperature and the temperature in the relief path, and a temperature difference estimated corresponding to the control signal.

With such a construction, the relief condition may be accurately judged from the temperature, even with a change in oil temperature, by detecting the difference between the oil temperature and the temperature inside the relief path.

Other objects and aspects of the present invention will become apparent from the following description of embodiments of the invention given in conjunction with the appended drawings.

DETAILED DESCRIPTION OF THE PREFERRED EMBODIMENTS

Figure 1:
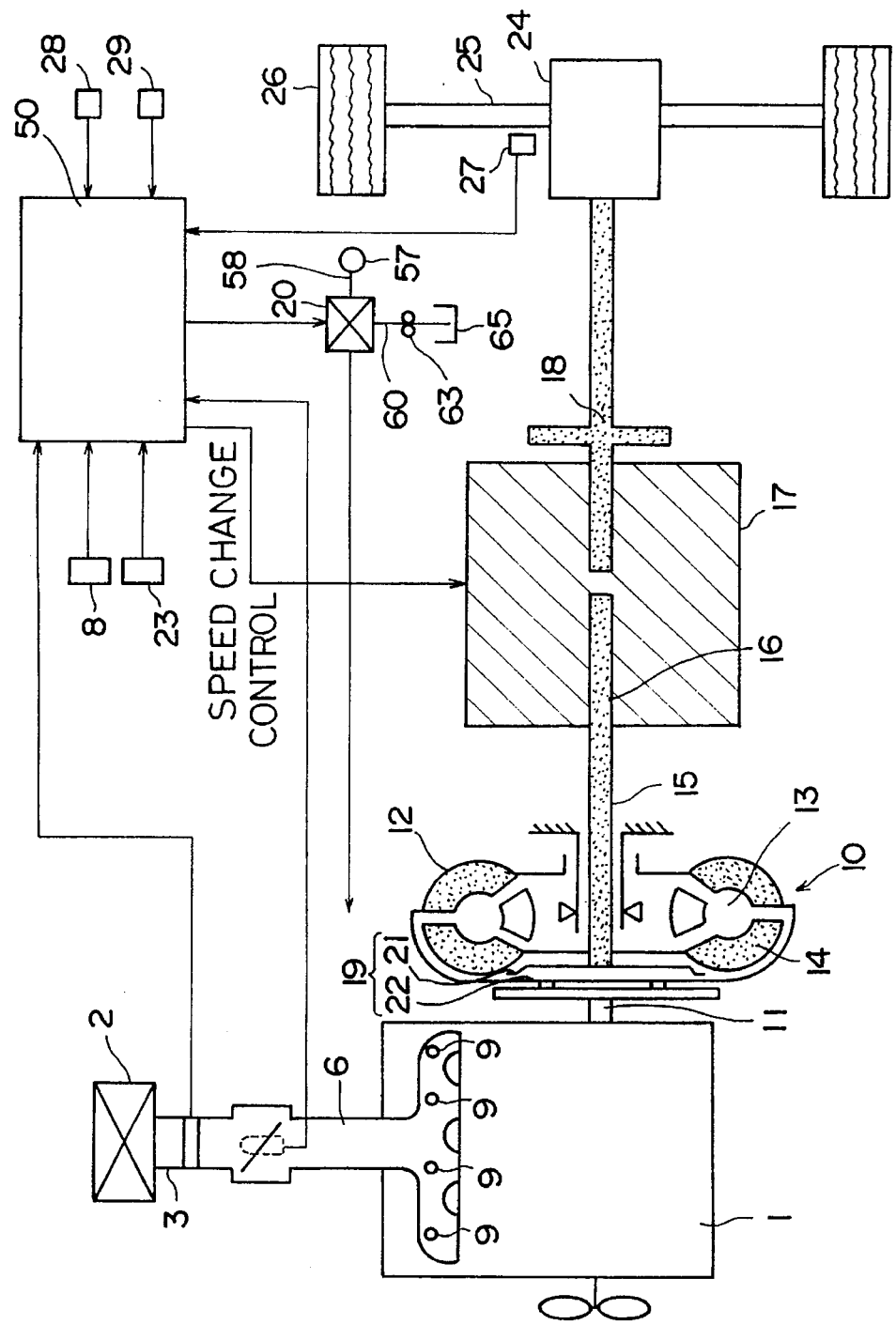
FIG. 1 is a schematic system diagram of a vehicle automatic transmission to which the fault diagnosis apparatus and method of the present invention can be applied.
Figure 2:
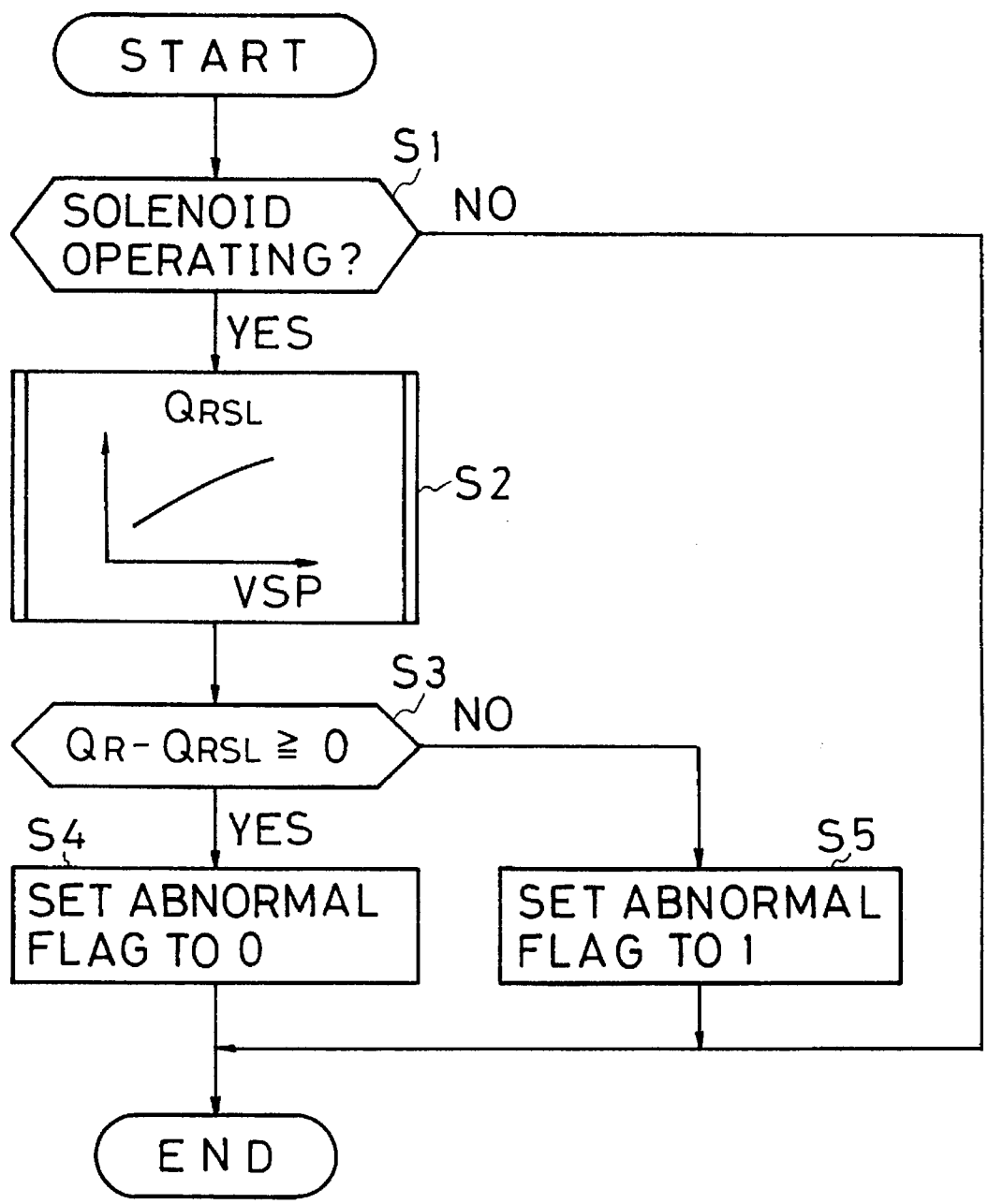
FIG. 2 is a flow chart showing a first embodiment of a fault diagnosis control routine, according to the present invention.
Figure 3:
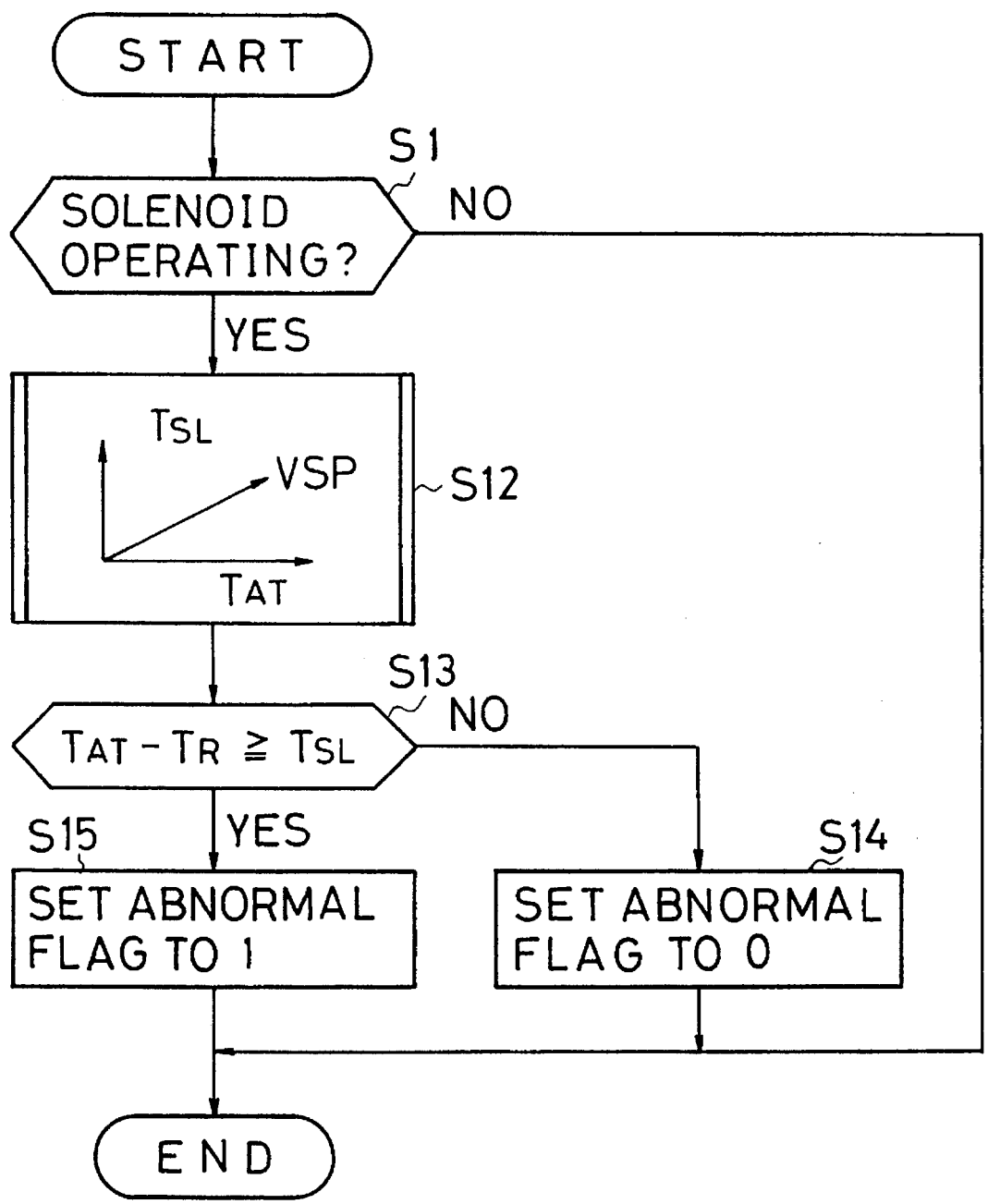
FIG. 3 is a diagram showing a second embodiment of a fault diagnosis control routine, according to the present invention.

Embodiments of a fault diagnosis apparatus and method for a hydraulic type lock-up clutch according to the present invention are shown in FIG. 1 through FIG. 3.

Referring to the system structure of the embodiment shown in FIG. 1, an engine 1 draws in air from an air cleaner 2 by way of an intake duct 3, and an intake manifold 6.

Fuel injection valves 9 are provided for each cylinder in respective branch portions of the intake manifold 6.

A control unit 50 incorporates a microcomputer having for example a CPU, ROM, RAM, A/D converter and input/output interface. This receives input signals from the various sensors and performs functions such as fuel injection quantity control.

An output shaft of the engine 1 is effectively integrally connected to the input shaft 11 of the torque converter 10 so as to rotatingly drive a pump impeller 12 which is also effectively integrally connected to the input shaft 11. A rotation force of the pump impeller 12 is transferred to a turbine liner 14 through an operating fluid 13 which is filled in the torque converter 10, so that the force of the engine 1 is ultimately transferred to an output shaft 15 of the torque converter 10 which is effectively integrally connected to the turbine liner 14. The force transferred to the output shaft 15 is input to the automatic transmission 17 by way of an input shaft 16 connected to the output shaft 15.

The force input in this way to the automatic transmission 17, is first changed by the mechanism inside the automatic transmission 17 to a predetermined speed based on a signal from the control unit 50, and is then output through an output shaft 18 by way of a differential gear 24 and an axle shaft 25 to the drive wheel 26.

With regards to the torque converter 10, this is provided with a lock-up clutch 19 which mechanically connects directly between the input shaft 11 and the output shaft 15. With the lock-up clutch 19, oil pressure from an oil pump 57 is supplied or shut off by opening or closing a lock-up solenoid 20 disposed in a hydraulic supply line 58, so that a lock-up piston 21 is moved towards the left in FIG. 1 to press against a friction plate 22 provided effectively integrally with the input shaft 11 and engage the lock-up clutch 19, or is moved to the right in FIG. 1 to separate from the friction plate 22.

The lock-up solenoid 20 opens or closes a valve, based on a control signal produced by the control unit 50 under predetermined conditions, and functions as a hydraulic control device.

With the present embodiment, the construction is such that the lock-up solenoid 20 opens the valve in a power off condition to engage the lock-up clutch 19, and closes the valve in a power supply condition to disengage the lock-up clutch 19.

However, while the construction is such that the lock-up solenoid 20 opens the valve to engage the lock-up clutch 19, and closes the valve to disengage the lock-up clutch 19, it is also possible for the alternative arrangement wherein the lock-up solenoid 20 opens the valve to disengage the lock-up clutch 19, and closes the valve to engage the lock-up clutch 19.

For speed detection, the axle shaft 25 is provided with a vehicle speed sensor 27 which, synchronously with the rotation of the axle shaft 25, generates a pulse signal per predetermined rotation angle. The output signal from the vehicle speed sensor 27 is input to the control unit 50, which computes the vehicle speed VSP based on this signal.

The operating oil is supplied at a predetermined pressure from the oil pump 57. However, when the lock-up solenoid 20 is in a valve closed condition, so that the oil pressure is not supplied to the lock-up clutch 19, the operating oil returns via a relief path 60 (return path) to an oil pan 65.

With a first embodiment constructed according to the present invention, a flow meter 63 is arranged in the relief path 60 leading from the lock-up solenoid 20 to the oil pan 65, for measuring the amount of operating oil (relief oil amount) flowing in the relief path 60. More specifically, the flow meter 63 detects the relief oil amount (the condition amount) in the hydraulic relief path 60 of the lock-up solenoid 20 (the hydraulic control device) and functioning as a condition amount detection device.

A lock-up solenoid fault diagnosis control routine (fault diagnosis device) related to the first embodiment, and carried out by the control unit 50 for diagnosing whether or not the lock-up solenoid 20 is operating normally, will now be described with reference to the flow chart of FIG. 2.

In step 1 (with step indicated by S in the figures) it is judged if a control signal for energizing the lock-up solenoid 20 and releasing engagement of the lock-up clutch 19 is being output from the control unit 50. When judged that a lock-up clutch disengage control signal is being output, control proceeds to step 2. On the other hand, if not being output, this signifies the condition of a lock-up clutch 19 engagement control signal being output, and since in this condition diagnosis is not possible, the routine is simply terminated.

More specifically, this step constitutes the control signal detection device.

If the lock-up solenoid 20 is operating normally, then in the lock-up disengage condition, the operating oil supplied at a predetermined pressure from the oil pump 57, returns via the relief path 60 to the oil pan 65. However, since the predetermined pressure changes with vehicle speed VSP, the relief oil amount in the lock-up disengage condition varies. Therefore in step 2, a judgement slice level QRSL (estimated value of the relief oil amount) corresponding to the relief oil amount flowing in the relief path 60 for when the lock-up solenoid 20 (lock-up clutch 19 hydraulic control device) is operating normally, is read in depending on the computed vehicle speed VSP.

Then in step 3, the judgement slice level QRSL read in step 2 is subtracted from the relief oil amount QR of the working oil flowing in the relief path 60 and detected by the flow meter 63 to obtain a difference, and it is judged whether the difference is positive or negative.

When judged that the difference is zero or positive (QR–QRSL≧0), this indicates that the relief oil amount QR is not less than the judgement slice level QRSL and hence the lock-up solenoid 20 is operating normally. Control thus proceeds to step 4 where the abnormal flag is set to "0" (normal condition) and the control routine then terminates.

On the other hand, when judged that the difference is negative (QR–QRSL <0), this indicates that only a relief oil amount QR less than the judgement slice level QRSL is being relieved, in spite of control to operate the lock-up solenoid 20 in the lock-up disengage condition so that the operating oil supplied at a predetermined pressure returns to the oil pan 65 by way of the relief path 60. Hence the lock-up solenoid 20 is not operating normally, and control thus proceeds to step 5 where the abnormal flag is set to "1" (abnormal condition), and the control routine then terminates.

In this way with the first embodiment, the lock-up solenoid 20 is diagnosed to be faulty when the relief oil amount is small, although the lock-up solenoid 20 is operated in the lock-up disengage condition so that the operating oil returns by way of the relief path. Accordingly, with this embodiment, a fault of the hydraulic control device can be accurately diagnosed with an extremely simple and low cost device, without the additional installation of separate equipment such as a high cost gear position sensor or a rotation sensor for detecting the rotational speed of the output shaft of the torque converter.

If the fault in the hydraulic control device is brought to the driver's attention for example by the flashing of a warning light so that remedial treatment can be carried out, then the undesirable conditions such as deterioration in fuel consumption, exhaust composition, and vehicle drivability which accompanies the fault in the hydraulic type lock-up clutch can be kept to a minimum.

Figure 4:
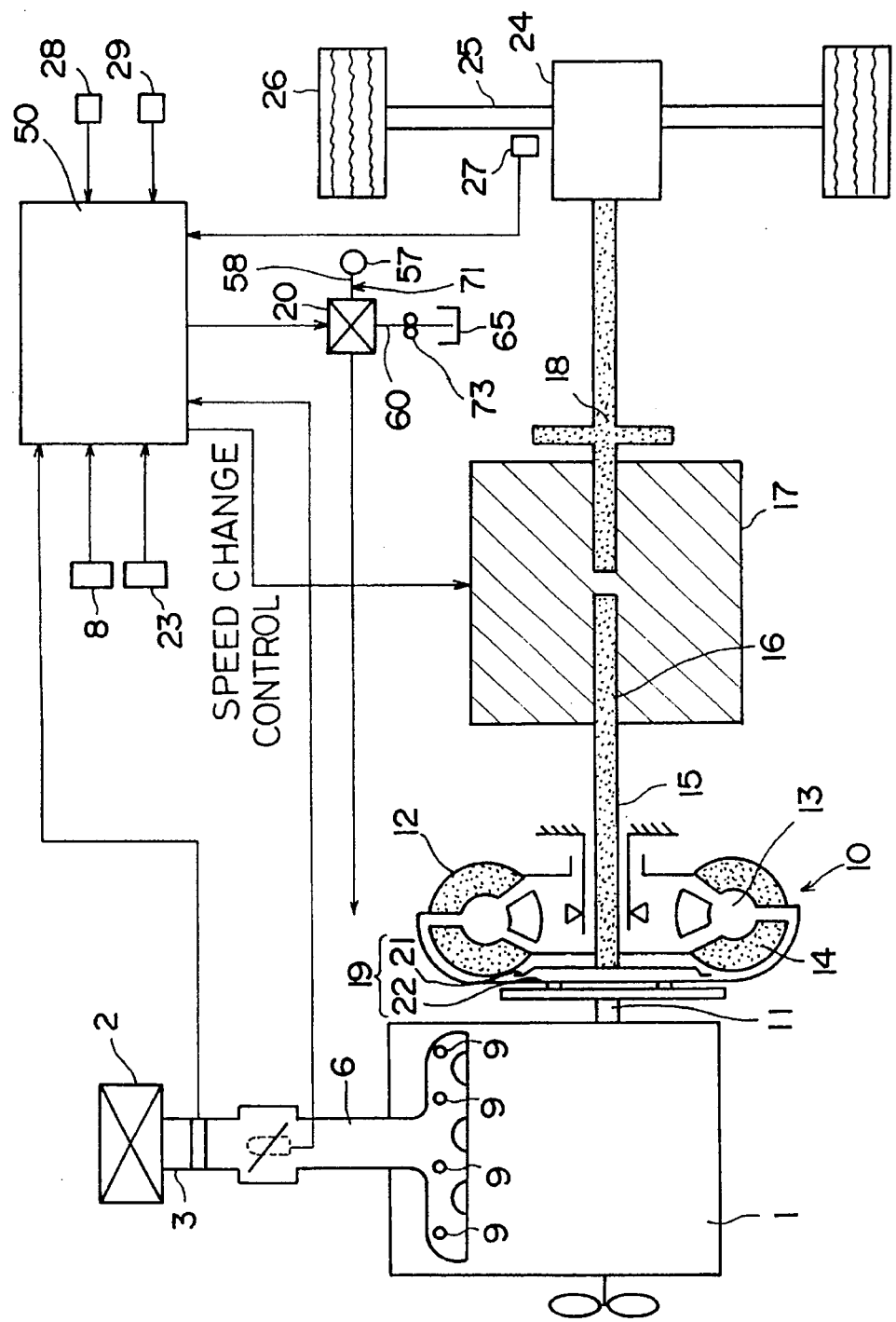
FIG. 4 is a schematic system diagram of a second embodiment of the invention.

Referring to FIG. 4, a second embodiment of the invention will now be described.

Since the second embodiment shown in FIG. 4 has the same overall construction as the first embodiment of FIG. 1, description will be omitted except for the following points.

With the second embodiment construction according to the present invention, a supply oil temperature gage 71 is provided in the hydraulic supply line 58 to measure a temperature TAT of the operating oil supplied from the oil pump 57 via the hydraulic supply line 58 and the lock-up solenoid 20 to the lock-up clutch 19. Moreover, a temperature gage 73 is provided in the relief path 60 for measuring a temperature TR of the operating oil flowing in the relief path 60 from the lock-up solenoid 20 to the oil pan 65. More specifically, the temperature gage 73 detects the temperature TR as the condition amount occurring in the relief path 60 of the lock-up solenoid 20 (which constitutes the hydraulic control device), and has the function of a condition amount detection device.

With the fault diagnosis control routine (fault diagnosis device) for the hydraulic control device of the lock-up clutch 19 illustrated by the flow chart of FIG. 3, steps having the same function as those of the flow chart of FIG. 2 are indicated with the same step number and description is here omitted.

In step 1, if judged that the disengage control signal for the lock-up clutch 19 is being output, control proceeds to step 12.

With the fault diagnosis control of the hydraulic type lock-up clutch 19 of the second embodiment, in step 12 a judgement slice level TSL (estimated value of the temperature difference) corresponding to the difference between the oil temperature TAT and the oil temperature TR for when the lock-up solenoid 20 is operating normally, is read in depending on the vehicle speed VSP computed based on the detection value of the vehicle speed sensor 27, and the oil temperature TAT of the operating oil supplied to the lock-up clutch 19.

That is to say, when the operation of the lock-up solenoid 20 is normal, the operating oil supplied at a predetermined pressure from the oil pump 57 returns via the relief path 60 to the oil pan 65. More specifically, since the operating oil supplied at a predetermined temperature from the oil pump 57 returns via the relief path 60 to the oil pan 65, then at the time the operating oil is returning via the relief path 60 to the oil pan 65, the temperature TR measured by the temperature gage 73 provided in the relief path 60, is approximately equal to the oil temperature TAT of the operating oil supplied to the lock-up clutch 19.

Consequently, in step 13 it is judged whether or not the difference between the oil temperature TAT and the oil temperature TR is greater than the judgement slice temperature TSL. When the difference is judged to be less than the judgement slice temperature TSL (TAT−TR<TSL), this indicates that operating oil of approximately the same temperature as the operating oil supplied to the lock-up clutch 19 flows in the relief path 60. The lock-up solenoid 20 is thus judged to be operating normally since, with the lock-up solenoid 20 operating normally and the operating oil flowing in the relief path 60, the oil temperature TR becomes approximately equal to the oil temperature TAT of the operating oil supplied to the lock-up clutch 19. Control thus proceeds to step 14 where the abnormal flag is set to "0" (normal condition) and the control routine then terminates.

On the other hand, when judged that the difference is greater than or equal to the judgement slice temperature TSL (TAT−TR≧TSL), this indicates that only a small amount of the operating oil is being returned, in spite of control to operate the lock-up solenoid 20 in the lock-up disengage condition so that the operating oil supplied at a predetermined pressure returns to the oil pan 65 by way of the relief path 60. Therefore, the oil temperature TR drops significantly from the oil temperature TAT of the operating oil supplied to the lock-up clutch 19, so that it is judged that the lock-up solenoid 20 is not operating normally. Control thus proceeds to step 15 where the abnormal flag is set to "1" (abnormal condition), and the control routine then terminates.

In this way, with the second embodiment also, the lock-up solenoid 20 is diagnosed to be faulty when the oil temperature in the relief path drops significantly from the oil temperature TAT of the operating oil supplied to the lock-up clutch 19, although the lock-up solenoid 20 is operated in the lock-up disengage condition so that the operating oil returns by way of the relief path. Accordingly, with this embodiment, a fault of the hydraulic control device can be accurately diagnosed with an extremely simple and low cost device, without the additional installation of separate equipment such as a high cost gear position sensor or a rotation sensor for detecting the rotational speed of the output shaft of the torque converter. Moreover, by making the oil temperature TAT of the operating oil a reference temperature, then fault diagnosis can be carried out to a high accuracy even with changes in the operating oil temperature.

With the embodiments as described above, in the first embodiment the relief oil amount of the operating oil flowing in the relief path 60 from the lock-up solenoid 20 to the oil pan 65 is used as the condition amount in the hydraulic relief path of the hydraulic control device, while in the second embodiment, the temperature TR of the hydraulic relief path 60 is used. However other parameters are also possible for the condition amount.

For example, the following can also be used: a change in the electrostatic capacity due to the presence or absence of the operating oil flowing in the relief path 60, a change in pressure of the relief path 60 depending on the presence or absence of the operating oil flowing therein, a change in sound generated when the fluid flows, a change in light transmissivity when a portion of the relief path 60 is formed from a material which transmits light and fluid flows past this portion. Needless to say it is also possible to diagnose a fault in the hydraulic control device based on the comparison of a condition amount and a value estimated from the control signal.

Moreover, by combining the first and second embodiments, it will be obvious that failure of the hydraulic type lock-up clutch can be diagnosed to an even greater accuracy.

I claim:

1. An apparatus for diagnosing a fault in a hydraulic type lock-up clutch provided in a torque converter disposed between an internal combustion engine and a transmission, for mechanically connecting an output shaft of the engine to an input shaft of the transmission and engaged or disengaged with oil pressure control in accordance with a control signal, said apparatus comprising:

control signal detection means for detecting the control signal which indicates engagement or disengagement of the hydraulic type lock-up clutch, condition amount detection means for detecting a condition amount in a hydraulic oil line, which changes with the oil pressure control in accordance with the control signal, and fault diagnosis means which diagnoses a fault in said hydraulic type lock-up clutch based on a comparison of a condition amount estimated according to the detected control signal and the detected condition amount.

2. An apparatus for diagnosing a fault in a hydraulic type lock-up clutch as claimed in claim 1, wherein said hydraulic type lock-up clutch is engaged or disengaged by switching between an oil pressure supply condition and a relief condition by means of a solenoid valve, and said condition amount detection means detects the condition amount in a hydraulic relief path.

3. An apparatus for diagnosing a fault in a hydraulic type lock-up clutch as claimed in claim 2, wherein said condition amount is an oil amount in the relief path.

4. An apparatus for diagnosing a fault in a hydraulic type lock-up clutch as claimed in claim 2, wherein said condition amount is a temperature in the relief path.

5. An apparatus for diagnosing a fault in a hydraulic type lock-up clutch as claimed in claim 4, wherein said fault diagnosis means diagnoses a fault in the hydraulic type lock-up clutch based on a comparison of a temperature difference between an oil temperature supplied to the lock-up clutch and an oil temperature relieved from the lock-up clutch, and a temperature difference estimated corresponding to said control signal.

6. A method of diagnosing a fault in a hydraulic type lock-up clutch provided in a torque converter disposed between an internal combustion engine and a transmission, for mechanically connecting an output shaft of the engine to an input shaft of the transmission and engaged or disengaged with oil pressure control in accordance with a control signal, said method comprising:

a step for detecting said control signal which indicates engagement or disengagement of the hydraulic type lock-up clutch, a step for detecting a condition amount in a hydraulic oil line, which changes with oil pressure control in accordance with said control signal, and a step for diagnosing a fault in said hydraulic type lock-up clutch based on a comparison of a condition amount estimated according to the detected control signal and the detected condition amount.

7. A method of diagnosing a fault in a hydraulic type lock-up clutch as claimed in claim 6, wherein said hydraulic type lock-up clutch is engaged or disengaged by switching between an oil pressure supply condition and a relief condition by means of a solenoid valve, and said step for detecting the condition amount detects the condition amount in a hydraulic relief path.

8. A method of diagnosing a fault in a hydraulic type lock-up clutch as claimed in claim 7, wherein said condition amount is an oil amount in the relief path.

9. A method of diagnosing a fault in a hydraulic type lock-up clutch as claimed in claim 7, wherein said condition amount is a temperature in the relief path.

10. A method of diagnosing a fault in a hydraulic type lock-up clutch as claimed in claim 9, wherein said step for diagnosing a fault, diagnoses a fault in the hydraulic type lock-up clutch based on a comparison of a temperature difference between an oil temperature supplied to the lock-up clutch and an oil temperature relieved from the lock-up clutch, and a temperature difference estimated corresponding to said control signal.

* * * * *